United States Patent [19]
Mochida

[11] Patent Number: 5,814,117
[45] Date of Patent: Sep. 29, 1998

[54] FILTER ELEMENT FOR AIR CLEANER FOR ENGINE

[75] Inventor: Kazuomi Mochida, Tokyo, Japan

[73] Assignee: Going Tokyo Co., Ltd., Tokyo, Japan

[21] Appl. No.: 595,409

[22] Filed: Feb. 5, 1996

[30] Foreign Application Priority Data

Oct. 30, 1995  [JP]  Japan ..................................... 7-012425

[51] Int. Cl.⁶ ................................................. B01D 46/52
[52] U.S. Cl. ............................ 55/385.3; 55/498; 55/502; 55/410; 55/521; 55/DIG. 28
[58] Field of Search ......................... 55/385.3, DIG. 28, 55/331, 336, 498, 500, 521, 502, 493, 509, 511, 529, 497, 510; 123/198 E

[56] References Cited

U.S. PATENT DOCUMENTS 5,549,722  8/1996  Zemaitis et al. ........................... 55/521
5,549,724  8/1996  MOchida et al. ........................... 55/336

*Primary Examiner*—Duane S. Smith
*Attorney, Agent, or Firm*—Rogers & Killeen

[57] ABSTRACT

To provide a filter element for an air cleaner unit for an engine including an elongated rectangular contour as seen in a plan view and having a corrugate sectional contour as seen from the front side, the one end side of the corrugated sectional contour is collected on the central side of the filter element, the other end side of the same is expanded to exhibit a substantially circular contour, the opposite ends of the filter element as seen in the circular contour are connected to each side by the side-by-side relationship to exhibit a substantially annular contour as seen in a plan view, and subsequently, a cover member designed to have a conical-shaped or a spinner-shaped contour is attached to the upper surface side and/or the lower surface side at the central part of the filter element main body.

11 Claims, 7 Drawing Sheets

FIG.8 Prior Art

FILTER ELEMENT FOR AIR CLEANER FOR ENGINE

BACKGROUND OF THE INVENTION

The present invention relates to the structure of a filter element for an element exposed type air cleaner unit to be mounted on a vehicle engine or the like.

Conventionally, a so-called covered type air cleaner unit having a filter element received in an air cleaner case to be connected to a suction duct is normally used as an air cleaner unit to be mounted on a suction system of a vehicle engine. In addition, an element exposed type air cleaner unit for allowing a filter element itself to be connected directly to the suction duct without any use of a cover serving as an air cleaner case is known as a so-called optional accessary or an after-part.

Since the filter element is exposed to the outside, the element exposed type air cleaner unit has an excellent air suction efficiency compared with the covered type air cleaner unit, and moreover, it can have an effect of increasing an engine output. For this reason, it is often used in place of the covered type air cleaner unit mounted on, e.g., a sport type vehicle. In view of the fact that an engine room has a limited mounting space, various kind of measure is taken with respect to the configuration and structure of a filter element so as to allow the filter element having an excellent suction efficiency to be employed for the vehicle.

Figure 8:
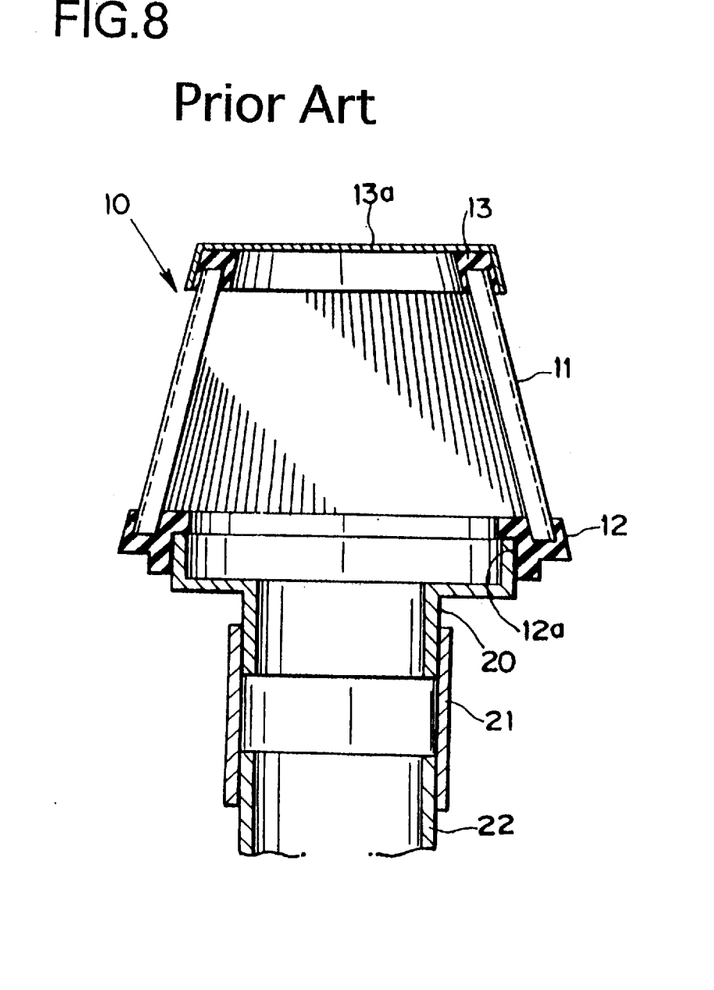
FIG. 8 is a sectional front view of a conventional prior art air cleaner unit.

FIG. 8 is a sectional front view which shows by way of example the structure of a conventional element exposed type air cleaner unit 10, and a main body 11 of a filter element is formed of a suitable filter material such as paper, cloth, unwoven fabric or the like to exhibit the contour of a tapered sleeve of which filtering wall surface is formed to have a corrugated sectional shape. A ring-shaped edge member 12 having a suction duct connection port 12a and molded of a synthetic rubber or a similar material is integrally connected to an opening end portion on the large diameter side by vulcanization, while a blind cover member 13a made of a metallic material is integrally connected to an opening end portion on the small diameter side also by vulcanization. The air cleaner unit 10 is mounted on the engine by firmly fitting the suction duct connection port 12a onto a joint fitting 20 and connecting a connection collar 21 molded of a synthetic rubber or the like to a suction pipe 22 on the engine side. Incidentally, the blind cover member 13a of the air cleaner unit 10 may integrally by united with the edge member 13 along the outer periphery thereof.

The conventional air cleaner unit 10 as shown in FIG. 8 can suck a large amount of air at a high efficiency even though the filter element main body 11 has a small outer contour, i.e., a small occupied volume, since it has a large air suction surface by forming the sectional surface of the filter element main body 11 to a tapered sleeve-shaped air suction surface having a corrugated sectional contour.

However, since the filter element main body 11 of the conventional type air cleaner unit 10 is designed to have a tapered sleeve-shaped contour, it has still a large occupied space, and moreover, there is a necessity for allowing the filter element main body 11 to be formed to a tapered sleeve-shaped contour, and moreover, allowing the edge members 12 and 13 to be integrally united with the opening portions at the extreme ends of the filter element main body 11. Thus, there are left still unsolved problems such as many manhours required for forming the filter material and fabricating the filter element main body. Another problem is such that due to the fact that a filter material having a corrugated sectional shape is used for the filter element, when a degree of cylindrical tapering of the filter element main body is reduced, a distance between a summit and a valley of the corrugated sectional shape on the small diameter side becomes small, resulting in an air suction efficiency around this part being reduced.

SUMMARY OF THE INVENTION

The present invention has been made in consideration of the aforementioned background.

A primary object of the present invention is to provide a filter element for an air cleaner unit for an engine having a very simple structure and assuring that a smaller occupied space is required than that of the conventional filter element based on the same filtering area as the conventional one, and moreover, manhours for forming a filter element main body and fabricating the same can substantially be reduced.

A secondary object of the present invention is to provide a filter element for an air cleaner unit for an engine assuring that a function of the part having a reduced air suction efficiency due to the narrowed distance between a summit and a valley of the tapered filter element main body can be improved.

According to one aspect of the present invention, there is provided a filter element for an air cleaner for an engine including a filter material having an elongated contour as seen in a plan view and having a corrugated sectional contour as seen from the front side, wherein the one end side of the corrugated sectional contour is collected on the central side of the filter element, the other end side of the same is expanded to exhibit a substantially circular contour, and the opposite ends of the filter element as seen in the circular contour are connected to each other in the side-by-side relationship to form a filter element main body having a substantially annular contour as seen in a plan view, and subsequently, a cover member designed to have a conical shaped or spinner-shaped contour is attached to the upper surface side and/or the lower surface side at the central part of the filter element main body.

According to other aspect of the present invention, there is provided a filter element for an air cleaner for an engine including an elongated rectangular contour as seen in a plan view and having a corrugated sectional contour as seen from the front side, wherein the one end side of the corrugated sectional contour is collected on the small diameter side, the other end side of the same is rounded on the large diameter side with some taper as seen from the front side, and the opposite ends of the filter element as seen in the circular contour are connected to each other in the side-by-side relationship to form a filter element main body having a large taper angle as seen from the front side, and subsequently, a cover member designed to have a conical-shaped or a spinner-shaped contour is attached to the upper surface side at the central part of the filter element main body.

With respect to the filter element of the present invention, it is desirable that a cover member is formed of a filter material. In addition, it is preferable that an edge member is integrally formed along the outer periphery of the filter element so that it is attached to the upper opening surface of, e.g., a funnel-shaped connection attachment connected to a suction pipe on the engine side.

Other objects, features and advantages of the present invention will become apparent from reading of the following description which has been made in conjunction with the accompanying drawings.

DESCRIPTION OF THE PREFERRED EMBODIMENTS

The present invention will now be described in detail hereinafter with reference to the accompanying drawings which illustrate preferred embodiments thereof.

Figure 1:
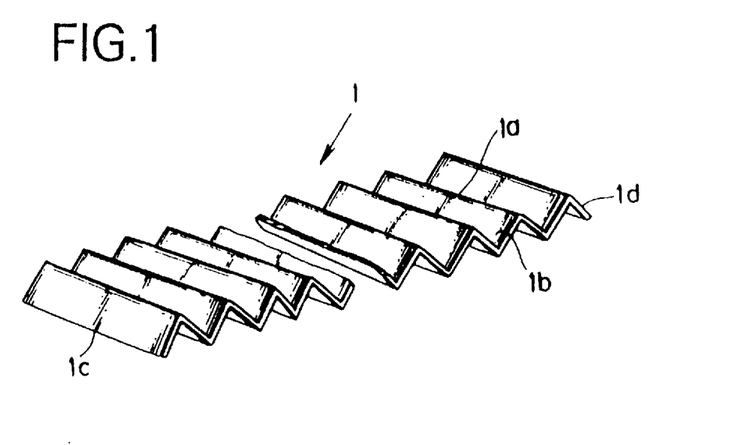
FIG. 1 is a perspective view which shows by way of example a filter material to be used for a filter element of the present invention.

In FIG. 1, reference numeral 1 denotes a filter material to be used for fabricating a filter element according to the present invention. The filter material 1 is formed of a cloth, paper, unwoven fabric or the like and has an elongated rectangular contour as seen in a plan view and exhibits a corrugated sectional planes as seen from front sides. Reference numeral 1a denotes a series of summits on the corrugated sectional contour, reference numeral 1b denotes a series of valleys of the corrugated sectional contour, and reference numerals 1c and 1d denote the opposite side ends of the filter material 1. Although not shown, a filter material of which inner and outer surfaces are covered with metallic nets is used for the filter material 1. It of course is obvious that a filter material which is not reinforced with metallic nets can be used for fabricating the filter element of the present invention.

Figure 2:
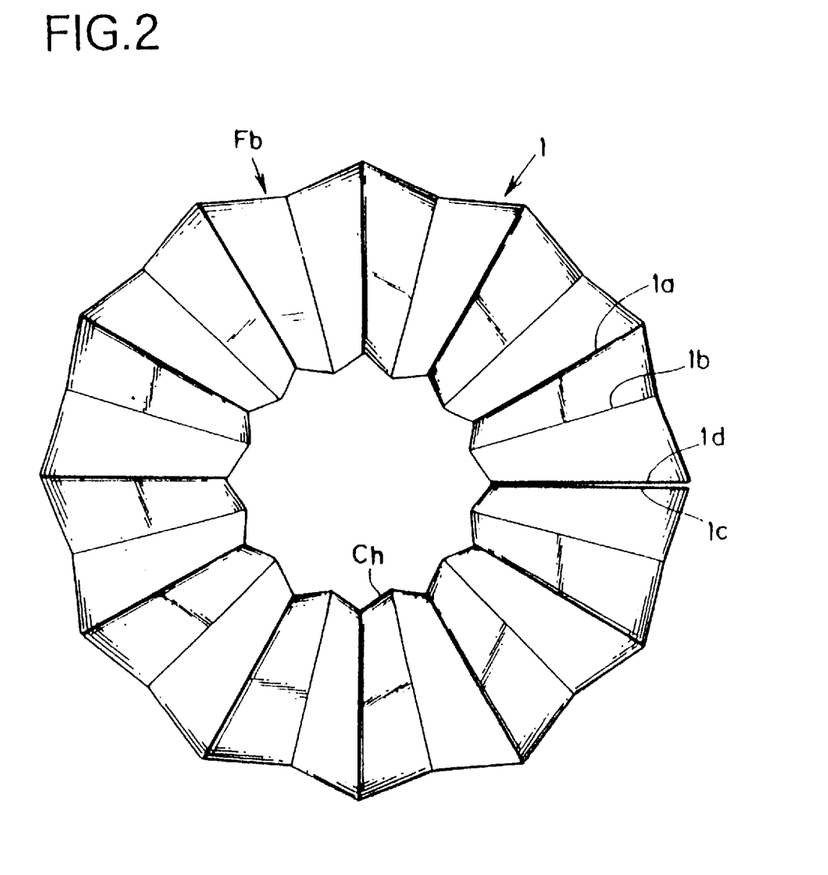
FIG. 2 is a plan view which shows by way of example that the filter material shown in FIG. 1 is formed to a filter element main body according to an embodiment of the present invention.
Figure 3:
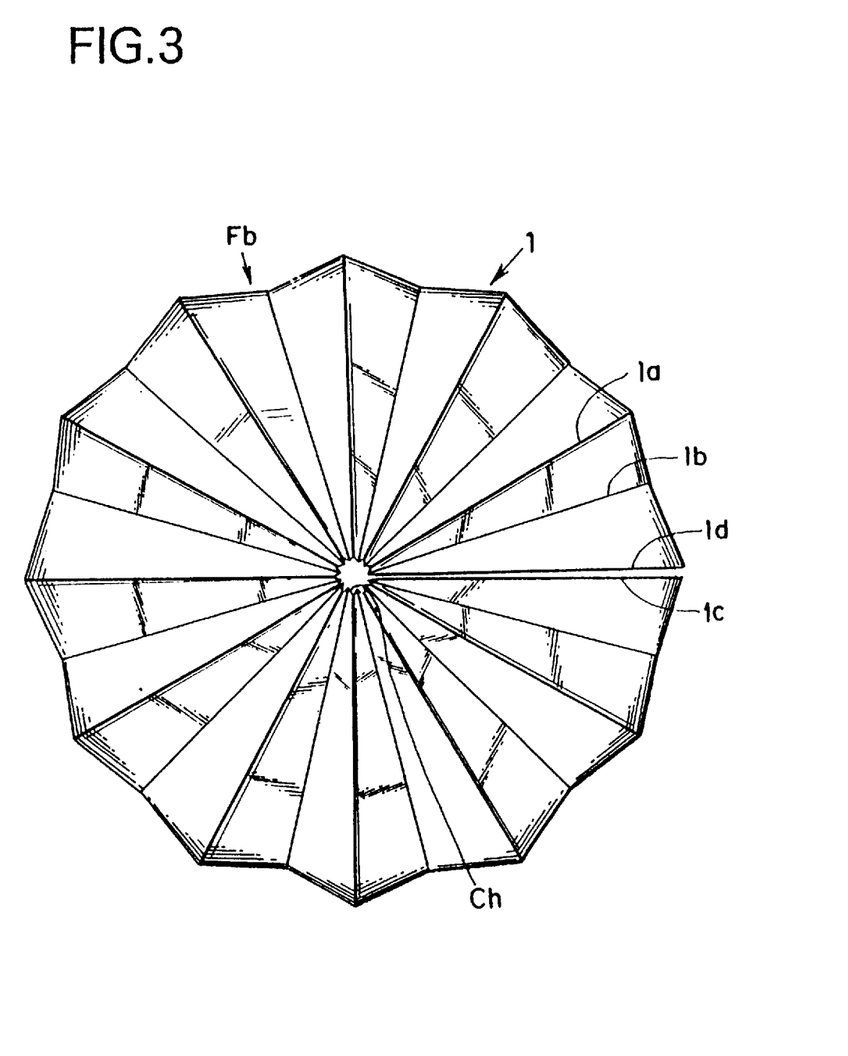
FIG. 3 is a plan view which shows by way of other example that the filter material shown in FIG. 1 is formed to a filter element main body according to another embodiment of the present invention.
Figure 4:
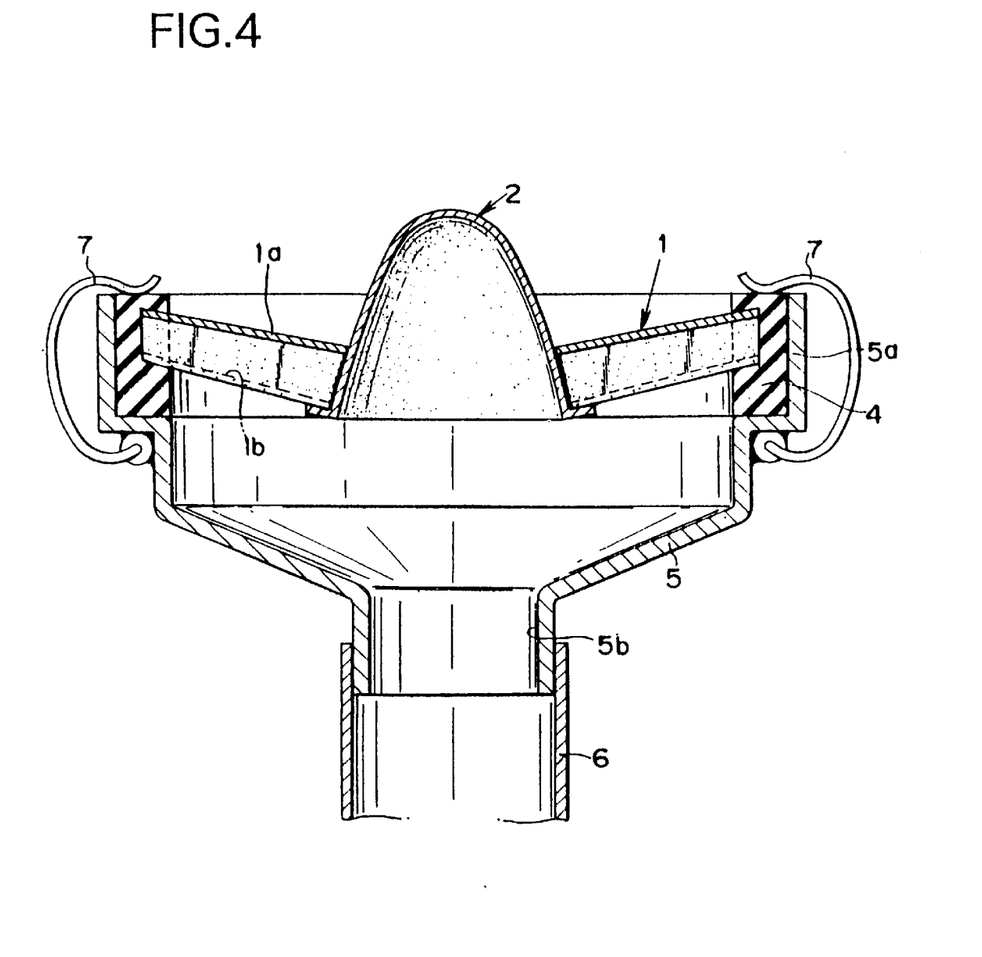
FIG. 4 is a sectional front view which shows by way of example that the filter element of the present invention is used for fabricating an air cleaner unit.
Figure 5:
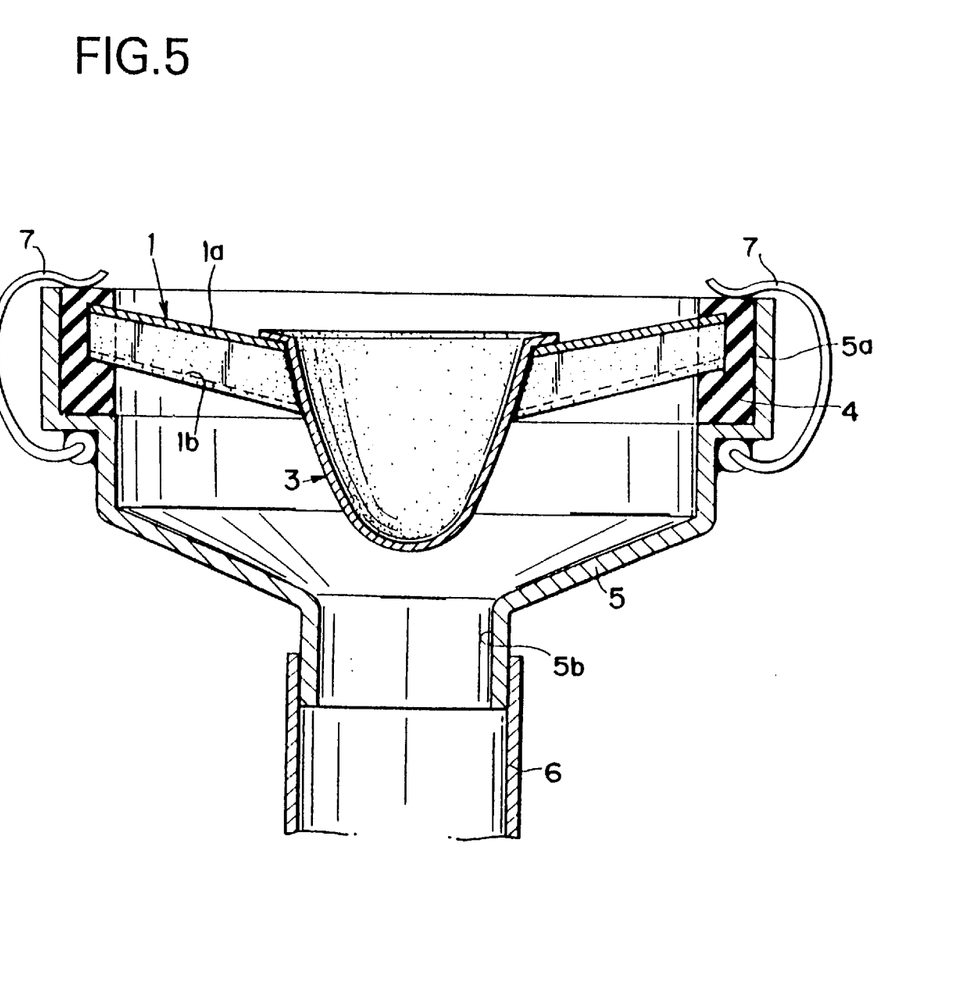
FIG. 5 is a sectional front view which shows by way of other example that the filter element of the present invention is used for fabricating an air cleaner unit.

In the shown embodiment, the filter material 1 has an elongated rectangular shape but it may exhibit a transversely elongated trapezoidal contour as seen in a plan view. By collecting the front side of the corrugated sectional contour about the center of a circle and expanding the opposite side of the same, the opposite ends 1c and 1d of the filter material 1 matingly come in contact with each other exemplified in FIG. 2 and they are integrated with each other by adhesion or by actuating a fixing tool so that a filter element main body Fb which exhibits an annular shape as seen in a plan view and is substantially flat as seen from the front side is formed. Since the filter material 1 has an elongated rectangular shape or exhibits a trapezoidal contour as seen in a plan view, a hole Ch is formed at the central part as shown in FIG. 2. In addition, the filter element main body Fb is formed without any formation of the hole Ch at the central part or only a small hole Ch is formed on the filter element main body Fb as shown in FIG. 3, depending on the ratio of a longitudinal length to a transverse length of the filter material 1. Besides the filter element main body Fb which is flat as seen from the front side, it may exhibit a truncated conical shape having a large obtuse angle (similar to a flat plane) or a tapered-shaped contour having a large taper angle as exemplified in FIG. 4 and FIG. 6. The summits 1a and the valleys 1b of the filter material 1 of the corrugated sectional contour get together at the central part of the filter element main body Fb, and the summits 1a and the valleys 1b of the same are parted away from each other along the outer periphery of the corrugated sectional contour of the filter element main body Fb. Since the summits 1a and the valleys 1b get together in that way, the central part of the filter element main body Fb has a reduced air suction efficiency.

Then, according to the present invention, as exemplified in FIGS. 4 to 7, a suitable filter material or a cap member 2 or a cover member 3 made of a metallic or plastic material to exhibit a conical or spinner-shaped contour as seen from the front side is fitted into the central hole Ch of the filter element main body Fb shown in FIG. 2 or FIG. 3 as an air correct streaming cone. In the present invention, the cover member 2 or 3 as shown in FIG. 4 to FIG. 7 may exhibit a conical or a pyramid-like contour as seen from the front side, and a normal plane of the cover 2 or 3 may be a convex plane or a concave plane. In other words, the contour of the cover 2 or 3 may arbitrarily be designed.

The filter element main body Fb exhibiting the annular contour as shown in FIG. 2 and having the cover member 2 or 3 fitted into the central hole Ch or the filter element main body Fb shown in FIG. 3 is integrally united with an edge member 4 having a rectangular sectional shape and molded of a rubber based material or a plastic based material so that an example of the air cleaner element of the present invention is formed.

Figure 6:
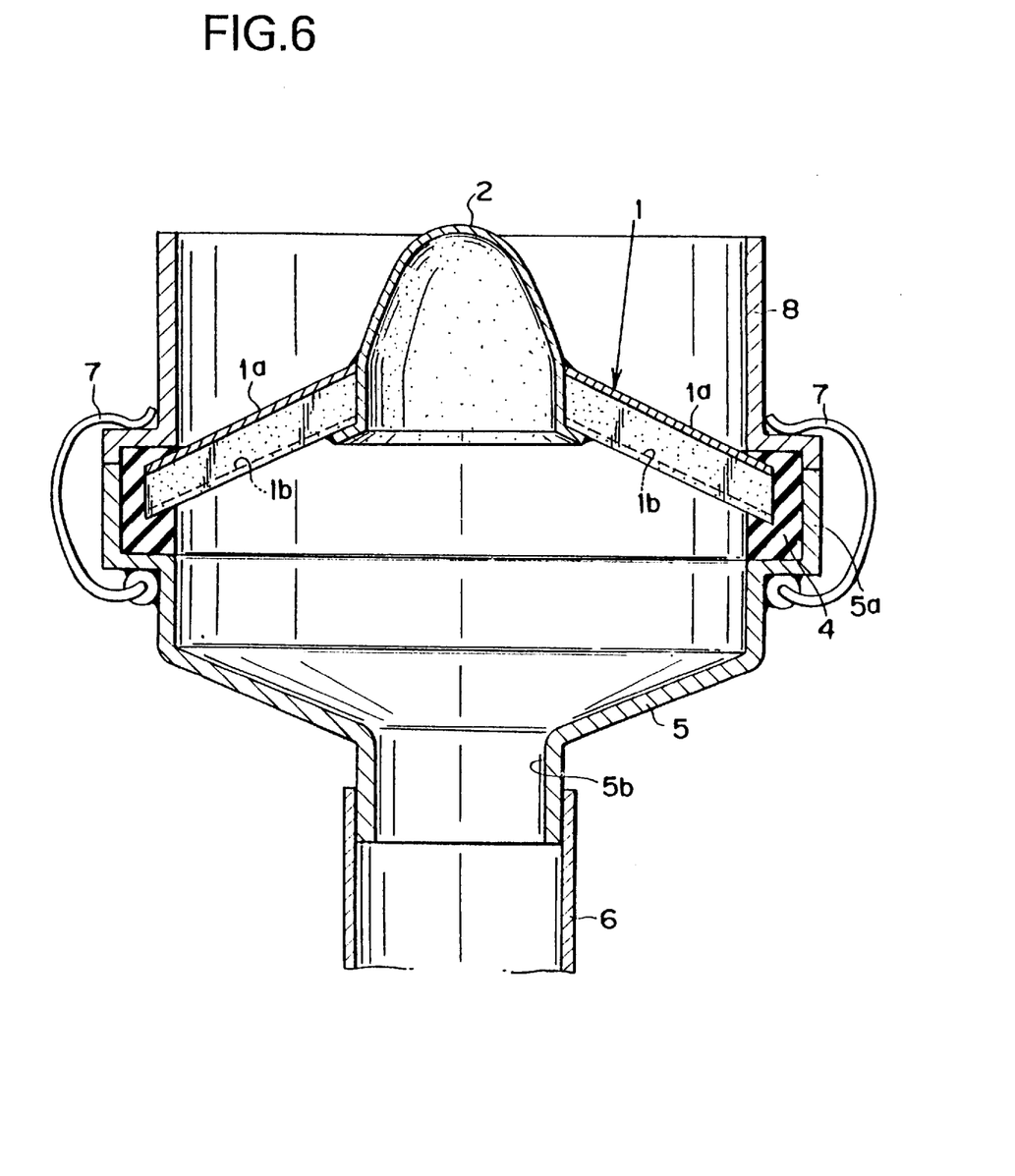
FIG. 6 is a sectional front view which shows by way of another example that the filter element of the present invention is used for fabricating an air cleaner unit.
Figure 7:
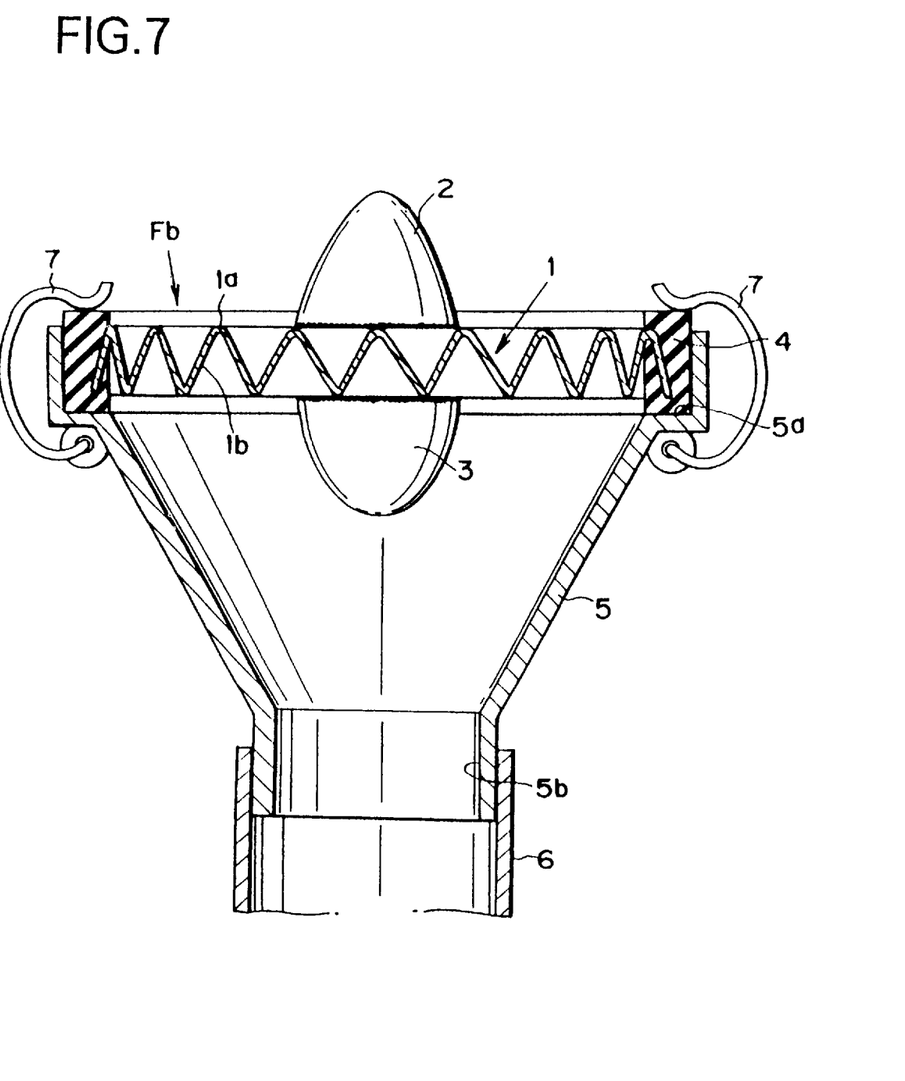
FIG. 7 is a sectional front view which shows by way of another example that the filter element of the present invention is used for fabricating an air cleaner unit.

As exemplified in FIG. 4 to FIG. 7, the filter element of the present invention is detachably fitted to an upper opening portion 5a of a separate funnel-shaped connection attachment 5 by actuating an openable clamp 7 at the edge member 4 so that the filter element is used as an air cleaner by connecting a lower opening portion 5b of the attachment 5 to a connection pipe 6 on the engine suction side. In FIG. 6, reference numeral 8 denotes a short sleeve-shaped retaining cover for retaining the edge member 4.

With the air cleaner having the filter element of the present invention used therefor, when the air sucking force of the engine is exerted on the interior of the connection attachment 5, air is sucked in the laminar state not only from the circular or annular filter element main body Fb but also from the outer surface of the cover 2 or 3 serving as a filter material. Then, the sucked air reaches the connection pipe 6 via the connection attachment 5 while part of the sucked air sucked through the central part covered by the cover 2 or 3 and having a low air suction efficiency is correctly streamed by the cover 2 or 3. Consequently, air is sucked with low noise, and moreover, eddy current hardly occurs at the time of air suction.

As described hereinbefore, since the filter element main body is constructed by forming a filter material having a substantially rectangular shape and a corrugated sectional contour to exhibit an annular shape as seen in a plan view, fitting a cover member formed of a filter material or a similar material at the central part thereof, and forming an edge member around the outer periphery thereof, the filter element main body can be formed easier and simpler than the conventional filter element main body of the type that a filter element is formed in the shape of a sleeve, and edge portions are formed at the upper and lower opening portions. In addition, since the filter element main body exhibits a flat plate-shaped circular or annular contour as seen in a plan view, the occupied space of the air cleaner having the filter element of the present invention used therefor can be reduced less than substantially a half compared with the conventional filter element exposed type air cleaner having the sleeve type filter element main body used therefor. Thus, the problem associated with a mounting space in an engine room or the like can easily be cleared. In addition, since the central part having a low air suction efficiency is covered by a spinner-like cover to correctly stream the air sucked around the cover, the cover functions to elevate a suction efficiency as a whole.

While the present invention has been described above with respect to preferred embodiments thereof, it should of course be understood that the present invention should not be limited only to these embodiments but various change or modification may be made without departure from the scope of the present invention as defined by the appended claims.

What is claimed is:

1. A vehicle engine air cleaner filter element comprising:
   a main body member formed from a quadrangular filter material member folded laterally into pleats having a first edge at one end and a second edge at the other end, said first and second edges being connected to each other in a side-by-side relationship forming a main body member having a substantially annular contour with said pleats extending radially, said main body member having an inner edge forming a central opening and an outer edge; and
   a cover member having a circular contour attached to said main body member and covering said central opening;
   said filter element having the structural capability to withstand the differential pressure across said element caused by air flowing through an air cleaner during operation of a vehicle engine connected thereto.

2. The filter element of claim 1 wherein said cover member comprises filter material.

3. The filter element of claim 2 wherein said cover member filter material is pleated.

4. The filter element of claim 1 wherein said cover member is conical-shaped.

5. The filter element of claim 1 wherein said cover member is dome-shaped.

6. The filter element of claim 1 wherein said quadrangular filter material member is trapezoidal.

7. The filter element of claim 1 wherein the main body member exhibits a truncated conical contour with a largely obtuse summit angle.

8. The filter element of claim 1 further comprising an edge member molded of rubber based or synthetic resin based material, said edge member being integrally united with the main body member around said outer edge; and an engine suction connection member, said edge member being fitted to said connection member connected to the suction side of an engine.

9. The filter element of claim 1 wherein said quadrangular filter material member is rectangular.

10. An air cleaner which filters intake air of an internal combustion engine suitable for a vehicle, said air cleaner comprising:
    (a) a housing defining an air intake passage, said housing having a larger diameter end and being connected at a smaller diameter end to the air intake of said internal combustion engine;
    (b) an annular filter member within said air intake passage of said housing, said filter member comprising pleated filter material having an inner edge forming a central opening with said pleats extending radially from said opening, and an outer edge, said filter material having sufficient strength to filter air flowing through said passage during operation of said engine;
    (c) an annular edge member connected to said housing within said air intake passage adjacent said larger diameter end of said housing, said edge member comprising molded rubber or synthetic resin and being integrally united with said filter member around said outer edge, said edge member being connected to said housing and outer edge to effect holding said filter member in place during the flow of air through said passage during operation of said engine; and
    (d) a circular cover member connected to said filter member and covering said central opening, said cover member comprising pleated filter material having the strength to filter air flowing through said passage during operation of said engine;
    said air cleaner having the size and strength to filter the intake air of a vehicle internal combustion engine.

11. The air cleaner of claim 10 wherein said filter member is a truncated cone and said cover member is dome shaped.

* * * * *